United States Patent
Krishnamoorthy et al.

(10) Patent No.: US 11,483,139 B2
(45) Date of Patent: Oct. 25, 2022

(54) SYSTEM FOR SECURE DATA TRANSMISSION USING FULLY HOMOMORPHIC ENCRYPTION

(71) Applicant: Bank of America Corporation, Charlotte, NC (US)

(72) Inventors: Madhusudhanan Krishnamoorthy, Hasthinapuram (IN); Lingaraj Sabat, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 16/987,669

(22) Filed: Aug. 7, 2020

(65) Prior Publication Data

US 2022/0045851 A1 Feb. 10, 2022

(51) Int. Cl.
| | |
|---|---|
| *H04L 9/08* | (2006.01) |
| *G06F 21/62* | (2013.01) |
| *H04L 9/30* | (2006.01) |
| *H04L 9/00* | (2022.01) |

(52) U.S. Cl.
CPC ........ *H04L 9/0825* (2013.01); *G06F 21/6209* (2013.01); *H04L 9/008* (2013.01); *H04L 9/0894* (2013.01); *H04L 9/30* (2013.01)

(58) Field of Classification Search
CPC ..... H04L 9/0825; H04L 9/008; H04L 9/0894; H04L 9/30; H04L 9/3226; G06F 21/6209
See application file for complete search history.

(56) References Cited

U.S. PATENT DOCUMENTS

| | | | |
|---|---|---|---|
| 7,500,111 B2 | 3/2009 | Hacigumus et al. |
| 7,640,432 B2 | 12/2009 | Gennaro et al. |
| 8,627,107 B1 | 1/2014 | Kennedy et al. |
| 8,861,716 B2 | 10/2014 | Halevi et al. |
| 8,903,083 B2 | 12/2014 | Gentry et al. |
| 9,129,122 B2 | 9/2015 | Sakumoto et al. |
| 9,736,128 B2 | 8/2017 | Premnath et al. |
| 9,813,234 B2 | 11/2017 | Clark et al. |
| 9,825,758 B2 | 11/2017 | Feng et al. |
| 9,876,636 B2 | 1/2018 | Yagisawa |
| 9,893,880 B2 | 2/2018 | Rohloff et al. |
| 9,900,147 B2 | 2/2018 | Laine et al. |

(Continued)

*Primary Examiner* — Kristine L Kincaid
*Assistant Examiner* — Lydia L Noel
(74) *Attorney, Agent, or Firm* — Moore & Van Allen PLLC; Anup Shrinivasan Iyer

(57) ABSTRACT

Systems, computer program products, and methods are described herein for secure data transmission using fully homomorphic encryption. The present invention is configured to electronically retrieve a data file from a source computing device, wherein the data file in encrypted using a public key; initiate a homomorphic engine on the data file, wherein the homomorphic engine comprises one or more homomorphic encryption algorithms; generate, using a first homomorphic encryption algorithm, a header and a trailer for the data file; generate, using the first homomorphic encryption algorithm, a unique row for the data file; generate an evaluation key based on at least generating the header, the trailer, and the unique row for the data file; append the header, the trailer, and the unique row to the data file to generate an appended data file; and transmit the appended data file to a target computing device.

20 Claims, 3 Drawing Sheets

(56) References Cited

U.S. PATENT DOCUMENTS

| | | | |
|---|---|---|---|
| 10,075,288 B1 | 9/2018 | Khedr et al. | |
| 10,075,289 B2 | 9/2018 | Laine et al. | |
| 10,153,894 B2 | 12/2018 | Laine et al. | |
| 10,171,230 B2 | 1/2019 | Yagisawa | |
| 10,296,709 B2 | 5/2019 | Laine et al. | |
| 10,319,032 B2 | 6/2019 | Zhan et al. | |
| 10,341,086 B2 | 7/2019 | Gajek et al. | |
| 10,375,066 B2 | 8/2019 | Chabanne et al. | |
| 10,404,668 B2 | 9/2019 | Tissot et al. | |
| 10,426,424 B2 | 10/2019 | Crotty et al. | |
| 10,439,798 B2 | 10/2019 | Savry et al. | |
| 2016/0323736 A1* | 11/2016 | Donahue | H04L 63/18 |
| 2021/0117553 A1* | 4/2021 | Shpurov | H04L 9/008 |
| 2021/0234841 A1* | 7/2021 | Abali | H04L 63/104 |

* cited by examiner

SYSTEM FOR SECURE DATA TRANSMISSION USING FULLY HOMOMORPHIC ENCRYPTION

FIELD OF THE INVENTION

The present invention embraces a system for secure data transmission using fully homomorphic encryption.

BACKGROUND

Data transmission involves the transmission of a data file over a point-to-point or point-to-multipoint communication channel from a source computing device to a target computing device. During file transmission, it is not uncommon for partial data file to be transmitted due to network issues or packet loss. In some cases, the source computing device may be in the process of downloading the data file, but has already initiated its transmission to the target computing device. In such cases, even though data file has not been successfully transmitted, the transmission may still be considered a success. Typically, transmission monitoring applications ensure complete and successful transmission of data by analyzing the records to determine whether the data transmitted by the source computing device matches the data received by the target computing device. In data files where the data contains sensitive information, allowing a transmission monitoring application to access the data may present exposure issues.

There is a need for a system to ensure successful transmission without compromising the sensitive data.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, system for secure data transmission using fully homomorphic encryption is presented. The system comprising: at least one non-transitory storage device; and at least one processing device coupled to the at least one non-transitory storage device, wherein the at least one processing device is configured to: electronically retrieve a data file from a source computing device, wherein the data file in encrypted using a public key; initiate a homomorphic engine on the data file, wherein the homomorphic engine comprises one or more homomorphic encryption algorithms; generate, using a first homomorphic encryption algorithm, a header and a trailer for the data file; generate, using the first homomorphic encryption algorithm, a unique row for the data file; generate an evaluation key based on at least generating the header, the trailer, and the unique row for the data file; append the header, the trailer, and the unique row to the data file to generate an appended data file; and transmit the appended data file to a target computing device.

In some embodiments, the at least one processing device is further configured to: establish a communication link with a secure encryption key repository, wherein the secure encryption key repository comprises the public key for decrypting the data file; and store the evaluation key in the secure encryption key repository, wherein the evaluation key is used to decrypt the appended data file.

In some embodiments, the at least one processing device is further configured to: electronically receive, from the target computing device, a request to access the secure encryption key repository to retrieve the evaluation key; electronically receive one or more authentication credentials from the target computing device; determine that the target computing device is authorized to access the secure encryption key repository based on at least validating the one or more authentication credentials; and authorize the target computing device to access the secure encryption key repository to retrieve the evaluation key based on at least determining that the target computing device is authorized to access the secure encryption key repository.

In some embodiments, the at least one processing device is further configured to: electronically receive an indication that the target computing device has received the appended data file; electronically receive an indication that the target computing device has decrypted the appended data file, wherein decrypting further comprises accessing the unique row, the header, and the trailer appended to the data file; and electronically receive, from the target computing device, a validation response in response to target computing device decrypting the appended data file, wherein the validation response comprises a header confirmation and a trailer confirmation, and a unique row confirmation.

In some embodiments, the at least one processing device is further configured to: compare the header confirmation with the header, the trailer confirmation with the trailer, and the unique row confirmation with the unique row to determine a match; generate a confirmation response based on at least determining the match between the header confirmation with the header, the trailer confirmation with the trailer, and the unique row confirmation with the unique row; and transmit the confirmation response to the target computing device.

In some embodiments, the at least one processing device is further configured to: electronically receive an indication that the target computing device has received the confirmation response; electronically receive, from the target computing device, a request to access the secure encryption key repository to retrieve the public key to decrypt the data file; and authorize the target computing device to access the secure encryption key repository to retrieve the public key.

In some embodiments, the at least one processing device is further configured to: determine that the header confirmation does not match the header, the trailer confirmation does not match the trailer, and/or the unique row confirmation does not match the unique row; generate, using a second homomorphic encryption algorithm, an alternate header and an alternate trailer for the data file; generate, using a second homomorphic encryption algorithm, an alternate unique row for the data file; generate an alternate evaluation key based on at least generating the alternate header, the alternate trailer, and the alternate unique row for the data file; append the header, the trailer, and the alternate unique row to the data file to generate an alternate appended data file; store the alternate evaluation key in the secure encryption key repository, wherein the alternate evaluation key is used to decrypt the alternate appended data file; and transmit the alternate appended data file to the target computing device.

In some embodiments, the at least one processing device is further configured to: generate, using the first homomorphic encryption algorithm, the header for the data file, wherein generating further comprises generating a unique identifier for the data file, unique identifier associated with the source computing device, and a unique identifier associated with the target computing device.

In some embodiments, the at least one processing device is further configured to: generate, using the first homomorphic encryption algorithm, the trailer for the data file, wherein generating further comprises: determining a number of records and position information associated with the number of records associated with the data file; determining one or more data fields with numerical data within the data file; initiating one or more computation algorithms on the one or more data fields with the numerical data, wherein initiating further comprises executing one or more arithmetic calculations on the one or more data fields with numerical data to generate one or more aggregated data values; and generating the trailer, wherein the trailer comprises at least the number of records in the data file, the position information associated with the number of records, and the one or more aggregated data values.

In another aspect, a computer program product for secure data transmission using fully homomorphic encryption is presented. The computer program product comprising a non-transitory computer-readable medium comprising code causing a first apparatus to: electronically retrieve a data file from a source computing device, wherein the data file in encrypted using a public key; initiate a homomorphic engine on the data file, wherein the homomorphic engine comprises one or more homomorphic encryption algorithms; generate, using a first homomorphic encryption algorithm, a header and a trailer for the data file; generate, using the first homomorphic encryption algorithm, a unique row for the data file; generate an evaluation key based on at least generating the header, the trailer, and the unique row for the data file; append the header, the trailer, and the unique row to the data file to generate an appended data file; and transmit the appended data file to a target computing device.

In another aspect, a method secure data transmission using fully homomorphic encryption is presented. The method comprising: electronically retrieving a data file from a source computing device, wherein the data file in encrypted using a public key; initiating a homomorphic engine on the data file, wherein the homomorphic engine comprises one or more homomorphic encryption algorithms; generating, using a first homomorphic encryption algorithm, a header and a trailer for the data file; generating, using the first homomorphic encryption algorithm, a unique row for the data file; generating an evaluation key based on at least generating the header, the trailer, and the unique row for the data file; appending the header, the trailer, and the unique row to the data file to generate an appended data file; and transmitting the appended data file to a target computing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
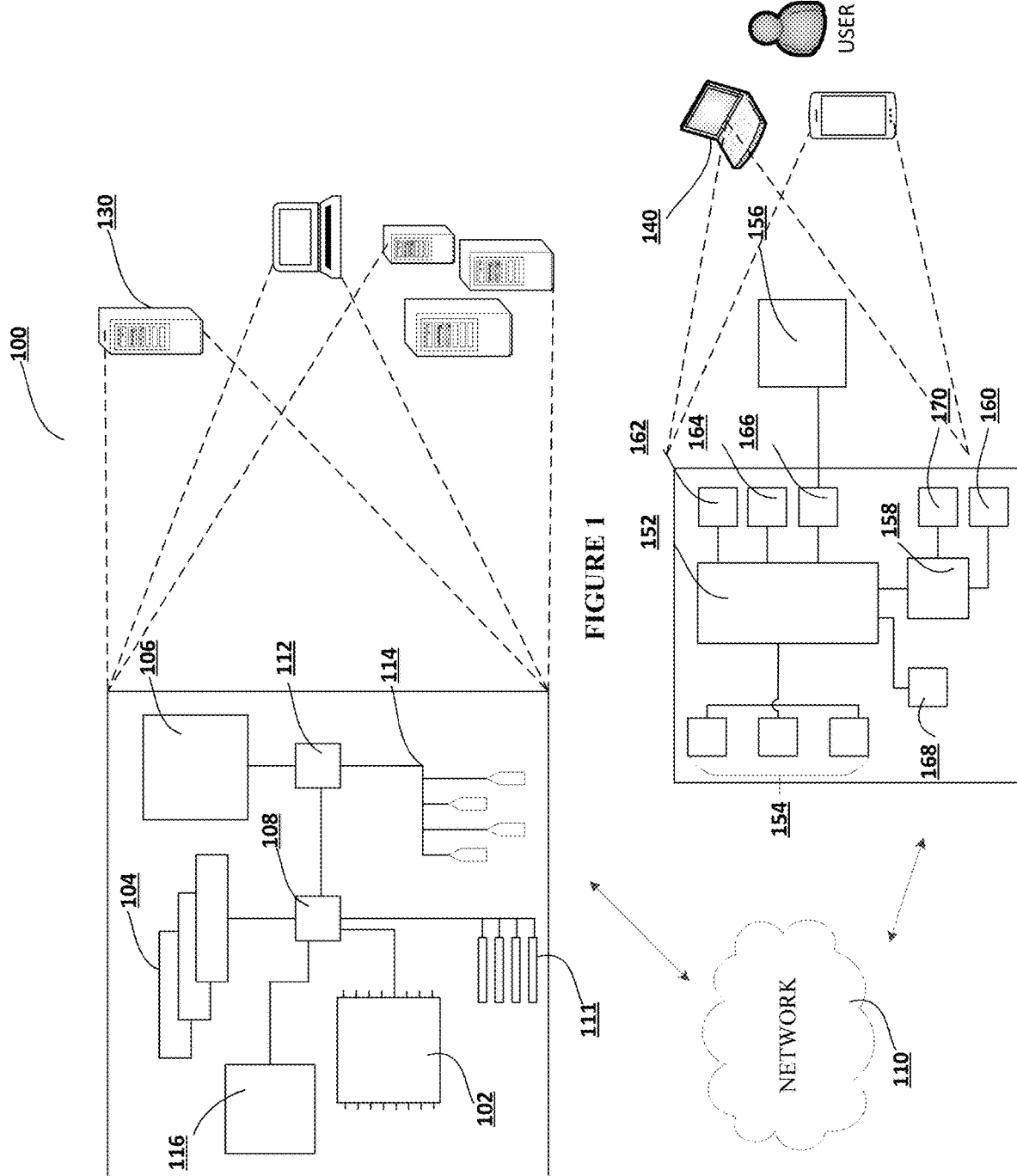
Figure 2:
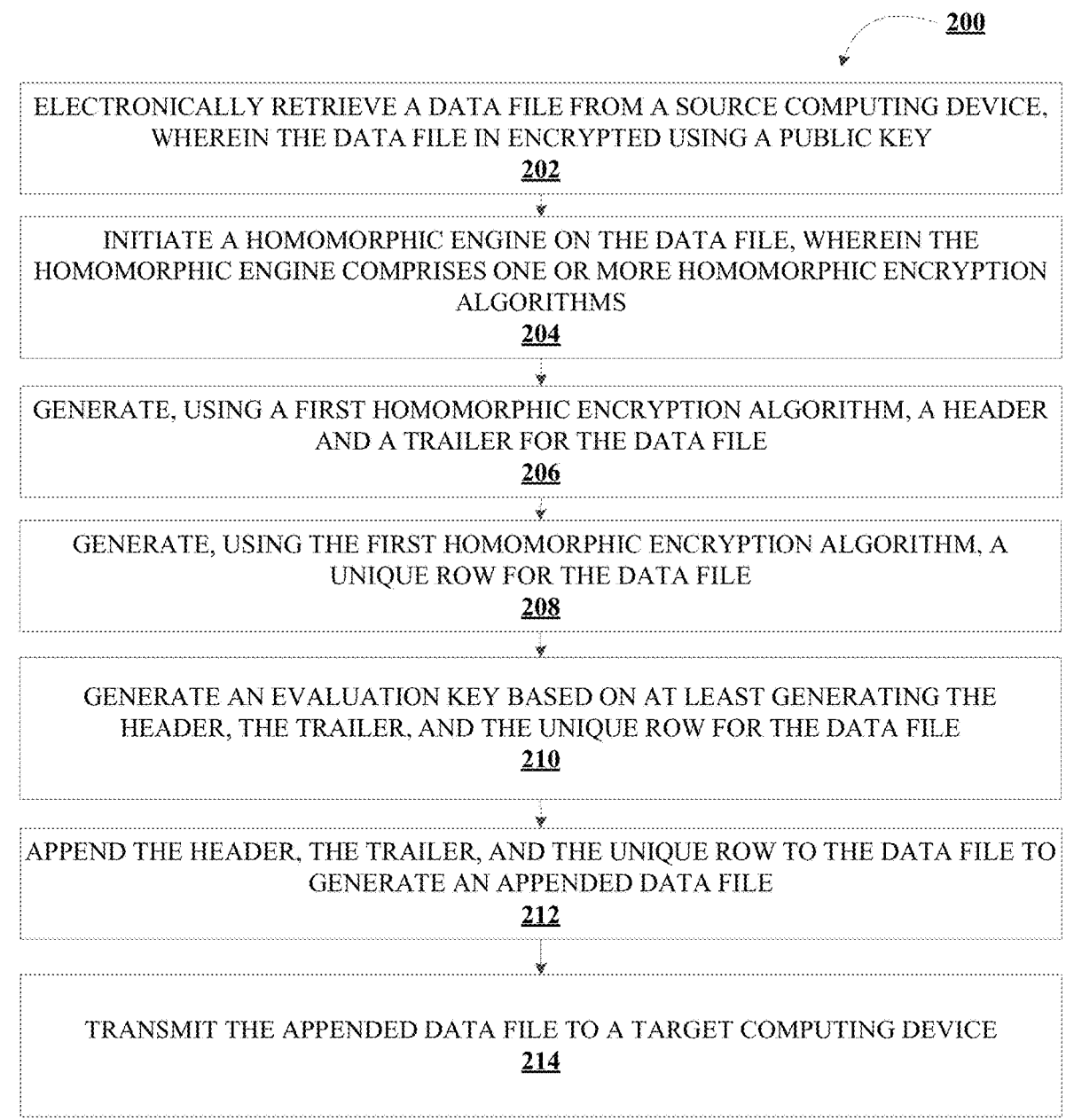
Figure 3:
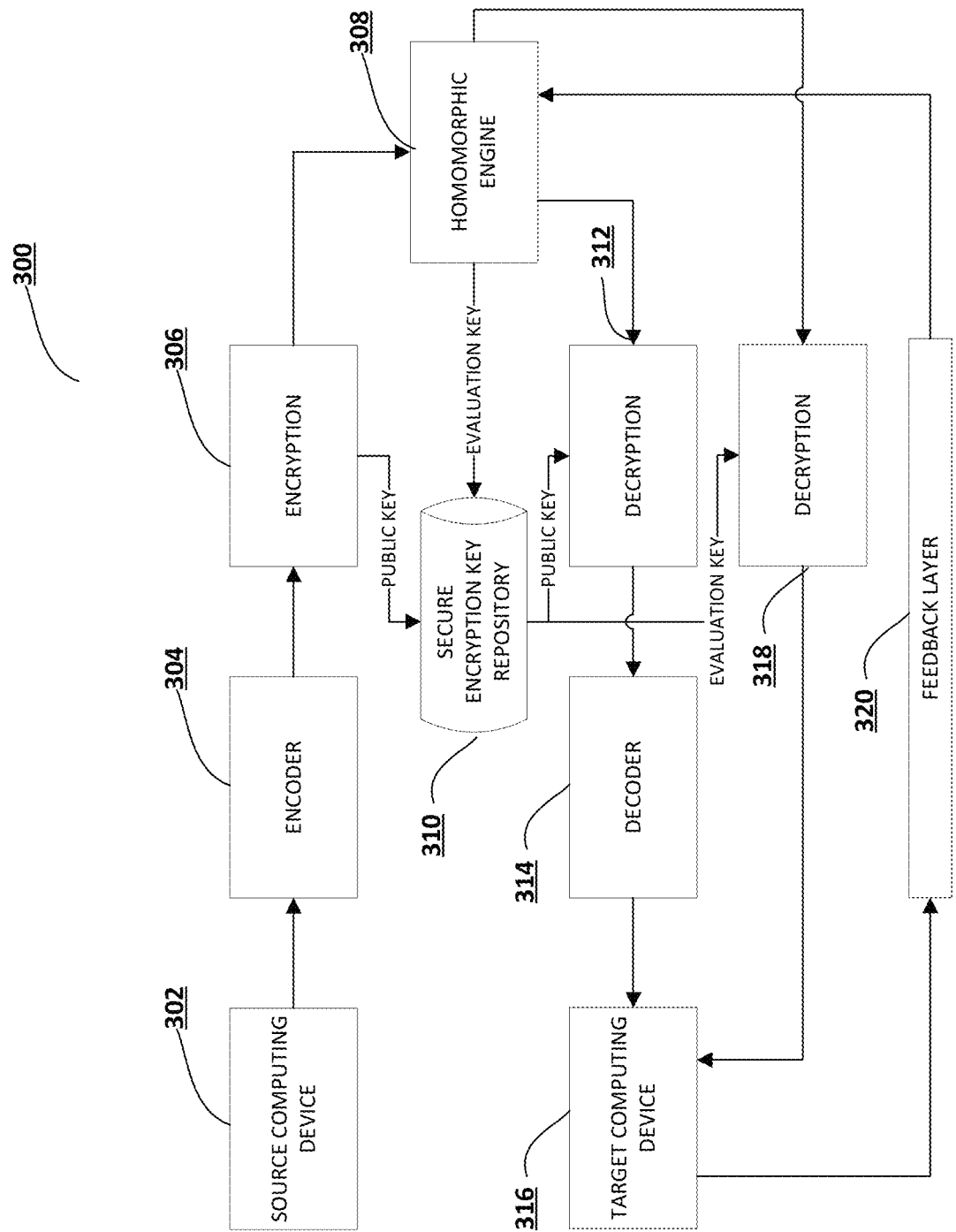

Having thus described embodiments of the invention in general terms, reference will now be made the accompanying drawings, wherein:

FIG. 1 illustrates technical components of a system for secure data transmission using fully homomorphic encryption, in accordance with an embodiment of the invention;

FIG. 2 illustrates a process flow for secure data transmission using fully homomorphic encryption, in accordance with an embodiment of the invention; and FIG. 3 illustrates a data flow chart for secure data transmission using fully homomorphic encryption, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for secure data transmission using fully homomorphic encryption 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Data transmission involves the transmission of a data file over a point-to-point or point-to-multipoint communication channel from a source computing device to a target computing device. In some cases, the target computing device may be downstream of the source computing device where the efficacy of applications and/or processes executed by the target computing device is dependent on the accuracy of the data file received from the source computing device. During file transmission, it is not uncommon for partial data file to be transmitted due to network issues or packet loss. In some cases, the source computing device may be in the process of downloading the data file, but has already initiated its transmission to the target computing device. In such cases, even though data file has not been successfully transmitted, the transmission may still be considered a success. Typically, transmission monitoring applications ensure complete and successful transmission of data by analyzing the records to determine whether the data transmitted by the source computing device matches the data received by the target computing device. In data files where the data contains sensitive information, allowing a transmission monitoring application to access the data may present exposure issues.

The present invention provides the functional benefit of using homomorphic encryption to monitor the transmission of the data file transmitted from the source computing device to the target computing device. By implementing a homomorphic engine on the data file after the source computing device has transmitted the data and before the target computing device has received the data, the present invention ensures that the data file has been successfully transmitted while retaining the sensitive nature of the data file.

FIG. 2 illustrates a process flow for secure data transmission using fully homomorphic encryption 200, in accordance with an embodiment of the invention. As shown in block 202, the process flow includes electronically retrieving a data file from a source computing device, wherein the data file in encrypted using a public key. The public key may be a random string of bits created explicitly to scramble and unscramble the data in the data file. In some embodiments, public key is used in combination with an encryption algorithm to transform plaintext to ciphertext (encryption) and vice versa (decryption). In embodiments contemplated herein, the encryption algorithm used to encrypt the data in the data file may be a symmetric-key algorithm where the same public key is used for both the encryption of the plaintext and the decryption of the cipertext. Other embodiments may be contemplated where the encryption algorithms may use two different keys for encryption and decryption. In some embodiments, the system may be configured to store the public key used to encrypt the data file and required to decrypt the data file in a secure encryption key repository. In this regard, the system may be configured to establish a communication link with a secure encryption key repository. In response to establishing the communication link, store the public key in the secure encryption key repository.

Next, as shown in block 204, the process flow includes initiating a homomorphic engine on the data file, wherein the homomorphic engine comprises one or more homomorphic encryption algorithms. In embodiments contemplated herein, the homomorphic engine may be implemented within and executed by the system 130. In doing so, the system 130 may be configured to execute source code embedded in the homomorphic engine to control specific features of the system 130 to execute specific computing operations.

Homomorphic encryption is a form of encryption that allows calculations to be performed on encrypted data without requiring the data to be decrypted first. The result of the computation is on an encrypted form, when decrypted the output is the same as if the operations had been performed on the unencrypted data. Homomorphic encryption includes multiple types of encryption schemes (types of algorithms) that can perform different classes of computations over encrypted data. Some common types of homomorphic encryption are partially homomorphic, somewhat homomorphic, leveled fully homomorphic, and fully homomorphic encryption. The computations are represented as either Boolean or arithmetic circuits. Fully homomorphic encryption schemes allow unlimited number of evaluation operations on the encrypted data and where the resulting output is within the ciphertext space. In other words, given ciphertexts that encrypt $\pi 1, \ldots, \pi t$, fully homomorphic encryption should allow anyone (not just the key-holder) to output a ciphertext that encrypts $f(\pi 1, \ldots, \pi t)$ for any desired function f, as long as that function can be efficiently computed. Partially homomorphic encryption encompasses schemes that support the evaluation of circuits consisting of only one type of gate, e.g., addition or multiplication. Somewhat homomorphic encryption schemes can evaluate two types of gates, but only for a subset of circuits. Leveled fully homomorphic encryption supports the evaluation of arbitrary circuits of bounded (pre-determined) depth.

Next, as shown in block 206, the process flow includes generating, using a first homomorphic encryption algorithm, a header and a trailer for the data file. In one example, the first homomorphic encryption algorithm may be a fully homomorphic encryption algorithm. In some embodiments, the header may include a unique identifier for the data file, unique identifier associated with the source computing device, and a unique identifier associated with the target computing device. In some other embodiments, the trailer may include at least the number of records in the data file, the position information associated with the number of records, and the one or more aggregated data values. In one aspect, the system may be configured to determine, using the first homomorphic encryption algorithm, a number of records and position information associated with the number of records in the data file. In addition, the system may be configured to determine one or more data fields with numerical data within the data file. In response, the system may be configured to initiate one or more computation algorithms on the one or more data fields with the numerical data. In one aspect, the one or more computation algorithms may be one or more arithmetic calculations. In this regard, the system may be configured to execute one or more arithmetic calculations on the one or more data fields with numerical data to generate one or more aggregated data values. In response, the system may be configured to generate the trailer with at least the number of records in the data file, the position information associated with the number of records, and the one or more aggregated data values.

Next, as shown in block 208, the process flow includes generating, using the first homomorphic encryption algorithm, a unique row for the data file. In some embodiments, the system may be configured to initiate one or more computation algorithms on the one or more data fields associated with the data file to generate one or more records forming a row. The uniqueness of this row depends on the type of homomorphic algorithm being implemented on the data file.

Next, as shown in block 210, the process flow includes generating an evaluation key based on at least generating the header, the trailer, and the unique row for the data file. In response, the system may be configured to store the evaluation key in the secure encryption key repository. This evaluation key will be required to decrypt the appended data file to access the header, trailer, and the unique row.

Next, as shown in block 212, the process flow includes appending the header, the trailer, and the unique row to the data file to generate an appended data file.

Next, as shown in block 214, the process flow includes transmitting the appended data file to a target computing device. In some embodiments, the system may be configured to receive, from the target computing device, a request to access the secure encryption key repository to retrieve the evaluation key. In response, the system may be configured to initiate an authentication protocol to determine whether the target computing device is authorized to access the evaluation key. In some embodiments, the system may be configured to electronically receive one or more authentication credentials from the target computing device. In response, the system may be configured to validate the one or more authentication credentials to determine whether the target computing device is authorized to access the secure encryption key repository to retrieve the evaluation key. On successful verification, the system may be configured to authorize the target computing device to access the secure encryption key repository to retrieve the evaluation key.

In some embodiments, the system may be configured electronically receive an indication that the target computing device has received the appended data file. Next, the system may be configured to electronically receive an indication that the target computing device has decrypted the appended data file. In one aspect, by decrypting the appended data file, the target computing device may access the unique row, the header, and the trailer appended to the data file. In some embodiments, the system may be configured to electronically receive, from the target computing device, a validation response in response to target computing device decrypting the appended data file. In one aspect, the validation response may include a header confirmation and a trailer confirmation, and a unique row confirmation.

In response, the system may be configured to compare the header confirmation with the header, the trailer confirmation with the trailer, and the unique row confirmation with the unique row to determine a match. In response, the system may be configured to generate a confirmation response based on at least determining the match between the header confirmation with the header, the trailer confirmation with the trailer, and the unique row confirmation with the unique row. If the transmission is successful, the unique row added by the first homomorphic encryption algorithm must match the unique row confirmation present in the validation response. Similarly, if the transmission is successful, the header added by the first homomorphic encryption algorithm must match the header confirmation and the trailer added by the first homomorphic encryption algorithm must match the trailer confirmation. In response to generating the confirmation response indicating as such, the system may be configured to transmit the confirmation response to the target computing device.

In some embodiments, the system may be configured to electronically receive an indication that the target computing device has received the confirmation response. In response, the system may be configured to electronically receive, from the target computing device, a request to access the secure encryption key repository to retrieve the public key to decrypt the data file. In response, the system may be configured to authorize the target computing device to access the secure encryption key repository to retrieve the public key. In some embodiments, the system may be configured to determine that the target computing device has already been authorized to access the secure encryption repository to retrieve the evaluation key. In response, the system may be configured to authorize the target computing device to access the secure encryption key repository to retrieve the public key without requiring additional authentication credentials. In some other embodiments, despite authorizing the target computing device to access the secure encryption key repository to retrieve the evaluation key, the system may be configured to initiate an authentication request to the target computing device and require additional authentication credentials to authorize the target computing device to access the secure encryption key repository to access the public key.

In some embodiments, the system may be configured to determine that the header confirmation does not match the header, the trailer confirmation does not match the trailer, and/or the unique row confirmation does not match the unique row. This is an indication that the transmission has not been successful. In such situations, the system may be configured to re-transmit the data file. In this regard, the system may be configured to automatically select a second homomorphic encryption algorithm (at random) from the homomorphic engine and generate an alternate appended data to be re-transmitted to the target computing device. Accordingly, the system may be configured to generate, using a second homomorphic encryption algorithm, an alternate header and an alternate trailer for the data file. In addition, the system may be configured to generate, using a second homomorphic encryption algorithm, an alternate unique row for the data file. In response, the system may be configured to generate an alternate evaluation key based on at least generating the alternate header, the alternate trailer, and the alternate unique row for the data file. Once generated, the alternate evaluation key is stored in the secure encryption key repository. Once the evaluation key is generated, the system may be configured to append the header, the trailer, and the alternate unique row to the data file to generate an alternate appended data file. The alternate evaluation key will be required to decrypt the alternate appended data file. In response, the system may be configured to transmit the alternate appended data file to the target computing device. This process of re-transmission using an alternate homomorphic encryption algorithm may be implemented repeatedly until the transmission is confirmed to be successful, i.e., the header, trailer, and the unique row match. In this regard, the system may be configured to implement each homomorphic encryption algorithm stored in the homomorphic engine until the transmission is successful.

In some embodiments, in response to determining that the transmission of the data file has not been successful, the system may be configured to initiate a multi-hop (or i-hop) homomorphic encryption scheme. In a multi-hop homomorphic scheme, a homomorphic algorithm may be applied not only to a fresh ciphertext (like the data file), but also to a ciphertext (appended data file) that was already subjected to another homomorphic algorithm. Thus, in some embodiments, the system may be configured to initiate the second homomorphic encryption algorithm on the appended data file, where the header, the trailer, and the unique row are treated as being part of the data file when implementing the algorithm. The "i" in i-hop homomorphic encryption scheme may refer to the number of times a homomorphic encryption algorithm may be implemented on a data file that has already been encrypted using a homomorphic encryption algorithm, while still being able to decrypt the data file. This process of re-transmission is implemented repeatedly until the transmission is confirmed to be successful.

In some embodiments, if after cycling through all the homomorphic encryption algorithms, the transmission is still unsuccessful, the system may be configured to generate an alert notification. In one aspect, in response to generating the alert notification, the system may be configured to transmit the alert notification to a user computing device. In another aspect, in response to generating the alert notification, the system may be configured to transmit a control signal configured to cause the source computing device to retransmit the data file to the target computing device. In some other embodiments, after a predetermined number of attempts, if the transmission is still unsuccessful, the system may be configured to trigger the homomorphic engine to interrupt any further re-transmission attempts and abort the transmission. In addition to aborting the transmission, any data retained during the re-transmission attempts are deleted from memory.

FIG. 3 illustrates a data flow chart for secure data transmission using fully homomorphic encryption 300, in accordance with an embodiment of the invention. As shown in FIG. 3, the source computing device 302, transmits the data file to the target computing device 316. The data file is first encoded by an encoder at 304, and then encrypted using one or more encryption algorithms 306. The encryption algorithm used to encrypt the data file also generates a public key that is required for the target computing device to decrypt the data file. The public key is then stored in a secure encryption key repository 310 that is accessible to the target computing device 316. The data file (that is encoded and encrypted) is then processed by the homomorphic engine 308 (implemented by the system 130) which generates a header, a trailer, and a unique row to be appended to the data file. In doing so, the homomorphic engine 308 generates an evaluation key that is stored in the secure encryption key repository 310. The evaluation key allows the target computing device to decrypt the appended data file to access the header, the trailer, and the unique row. This appended data file is then transmitted to the target computing device 316. The target computing device 316 retrieves the evaluation key from the secure encryption key repository 310 to decrypt the appended data file and access the header, the trailer, and the unique row. In response, the target computing device 316 transmits a header confirmation, a trailer confirmation, and a unique row confirmation to the homomorphic engine 308 via the feedback layer 320. The homomorphic engine 308 then compares the header confirmation to the header, the trailer confirmation to the trailer, and the unique row confirmation to the unique row to determine a match. If the comparison is successful and all three parameters match, then the homomorphic engine 308 transmits a confirmation response to the target computing device 316 that the data file has been transmitted successfully and completely. In response, the target computing device 316 retrieves the public key from the secure encryption key repository 310 and decrypts the data file 312 and then decodes 314 the data file to access the data.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for secure data transmission using fully homomorphic encryption, the system comprising:
at least one non-transitory storage device; and
at least one processing device coupled to the at least one non-transitory storage device, wherein the at least one processing device is configured to:
electronically retrieve a data file from a source computing device, wherein the data file in encrypted using a public key;
initiate a homomorphic engine on the data file, wherein the homomorphic engine comprises one or more homomorphic encryption algorithms;
generate, using a first homomorphic encryption algorithm, a header and a trailer for the data file;
generate, using the first homomorphic encryption algorithm, a unique row for the data file;
generate an evaluation key based on at least generating the header, the trailer, and the unique row for the data file;
append the header, the trailer, and the unique row to the data file to generate an appended data file; and
transmit the appended data file to a target computing device.

2. The system of claim 1, wherein the at least one processing device is further configured to:
establish a communication link with a secure encryption key repository, wherein the secure encryption key repository comprises the public key for decrypting the data file; and
store the evaluation key in the secure encryption key repository, wherein the evaluation key is used to decrypt the appended data file.

3. The system of claim 2, wherein the at least one processing device is further configured to:
electronically receive, from the target computing device, a request to access the secure encryption key repository to retrieve the evaluation key;
electronically receive one or more authentication credentials from the target computing device;
determine that the target computing device is authorized to access the secure encryption key repository based on at least validating the one or more authentication credentials; and
authorize the target computing device to access the secure encryption key repository to retrieve the evaluation key based on at least determining that the target computing device is authorized to access the secure encryption key repository.

4. The system of claim 3, wherein the at least one processing device is further configured to:
electronically receive an indication that the target computing device has received the appended data file;
electronically receive an indication that the target computing device has decrypted the appended data file, wherein decrypting further comprises accessing the unique row, the header, and the trailer appended to the data file; and
electronically receive, from the target computing device, a validation response in response to target computing device decrypting the appended data file, wherein the validation response comprises a header confirmation and a trailer confirmation, and a unique row confirmation.

5. The system of claim 4, wherein the at least one processing device is further configured to:
compare the header confirmation with the header, the trailer confirmation with the trailer, and the unique row confirmation with the unique row to determine a match;
generate a confirmation response based on at least determining the match between the header confirmation with the header, the trailer confirmation with the trailer, and the unique row confirmation with the unique row; and
transmit the confirmation response to the target computing device.

6. The system of claim 5, wherein the at least one processing device is further configured to:
electronically receive an indication that the target computing device has received the confirmation response;
electronically receive, from the target computing device, a request to access the secure encryption key repository to retrieve the public key to decrypt the data file; and
authorize the target computing device to access the secure encryption key repository to retrieve the public key.

7. The system of claim 6, wherein the at least one processing device is further configured to:
determine that the header confirmation does not match the header, the trailer confirmation does not match the trailer, and/or the unique row confirmation does not match the unique row;
generate, using a second homomorphic encryption algorithm, an alternate header and an alternate trailer for the data file;
generate, using a second homomorphic encryption algorithm, an alternate unique row for the data file;
generate an alternate evaluation key based on at least generating the alternate header, the alternate trailer, and the alternate unique row for the data file;
append the header, the trailer, and the alternate unique row to the data file to generate an alternate appended data file;
store the alternate evaluation key in the secure encryption key repository, wherein the alternate evaluation key is used to decrypt the alternate appended data file; and
transmit the alternate appended data file to the target computing device.

8. The system of claim 7, wherein the at least one processing device is further configured to:
generate, using the first homomorphic encryption algorithm, the header for the data file, wherein generating further comprises generating a unique identifier for the data file, unique identifier associated with the source computing device, and a unique identifier associated with the target computing device.

9. The system of claim 7, wherein the at least one processing device is further configured to:
generate, using the first homomorphic encryption algorithm, the trailer for the data file, wherein generating further comprises:
determining a number of records and position information associated with the number of records associated with the data file;
determining one or more data fields with numerical data within the data file;
initiating one or more computation algorithms on the one or more data fields with the numerical data, wherein initiating further comprises executing one or more arithmetic calculations on the one or more data fields with numerical data to generate one or more aggregated data values; and
generating the trailer, wherein the trailer comprises at least the number of records in the data file, the position information associated with the number of records, and the one or more aggregated data values.

10. A computer program product for secure data transmission using fully homomorphic encryption, the computer program product comprising a non-transitory computer-readable medium comprising code causing a first apparatus to:
electronically retrieve a data file from a source computing device, wherein the data file in encrypted using a public key;
initiate a homomorphic engine on the data file, wherein the homomorphic engine comprises one or more homomorphic encryption algorithms;
generate, using a first homomorphic encryption algorithm, a header and a trailer for the data file;
generate, using the first homomorphic encryption algorithm, a unique row for the data file;
generate an evaluation key based on at least generating the header, the trailer, and the unique row for the data file;
append the header, the trailer, and the unique row to the data file to generate an appended data file; and
transmit the appended data file to a target computing device.

11. The computer program product of claim 10, wherein the first apparatus is further configured to:
establish a communication link with a secure encryption key repository, wherein the secure encryption key repository comprises the public key for decrypting the data file; and
store the evaluation key in the secure encryption key repository, wherein the evaluation key is used to decrypt the appended data file.

12. The computer program product of claim 11, wherein the first apparatus is further configured to:
electronically receive, from the target computing device, a request to access the secure encryption key repository to retrieve the evaluation key;
electronically receive one or more authentication credentials from the target computing device;
determine that the target computing device is authorized to access the secure encryption key repository based on at least validating the one or more authentication credentials; and
authorize the target computing device to access the secure encryption key repository to retrieve the evaluation key based on at least determining that the target computing device is authorized to access the secure encryption key repository.

13. The computer program product of claim 12, wherein the first apparatus is further configured to:
electronically receive an indication that the target computing device has received the appended data file;
electronically receive an indication that the target computing device has decrypted the appended data file, wherein decrypting further comprises accessing the unique row, the header, and the trailer appended to the data file; and
electronically receive, from the target computing device, a validation response in response to target computing device decrypting the appended data file, wherein the validation response comprises a header confirmation and a trailer confirmation, and a unique row confirmation.

14. The computer program product of claim 13, wherein the first apparatus is further configured to:
compare the header confirmation with the header, the trailer confirmation with the trailer, and the unique row confirmation with the unique row to determine a match;
generate a confirmation response based on at least determining the match between the header confirmation with the header, the trailer confirmation with the trailer, and the unique row confirmation with the unique row; and transmit the confirmation response to the target computing device.

15. The computer program product of claim 14, wherein the first apparatus is further configured to:

electronically receive an indication that the target computing device has received the confirmation response;

electronically receive, from the target computing device, a request to access the secure encryption key repository to retrieve the public key to decrypt the data file; and authorize the target computing device to access the secure encryption key repository to retrieve the public key.

16. The computer program product of claim 15, wherein the first apparatus is further configured to:

determine that the header confirmation does not match the header, the trailer confirmation does not match the trailer, and/or the unique row confirmation does not match the unique row;

generate, using a second homomorphic encryption algorithm, an alternate header and an alternate trailer for the data file;

generate, using a second homomorphic encryption algorithm, an alternate unique row for the data file;

generate an alternate evaluation key based on at least generating the alternate header, the alternate trailer, and the alternate unique row for the data file;

append the header, the trailer, and the alternate unique row to the data file to generate an alternate appended data file;

store the alternate evaluation key in the secure encryption key repository, wherein the alternate evaluation key is used to decrypt the alternate appended data file; and transmit the alternate appended data file to the target computing device.

17. The computer program product of claim 16, wherein the first apparatus is further configured to:

generate, using the first homomorphic encryption algorithm, the header for the data file, wherein generating further comprises generating a unique identifier for the data file, unique identifier associated with the source computing device, and a unique identifier associated with the target computing device.

18. The computer program product of claim 16, wherein the first apparatus is further configured to:

generate, using the first homomorphic encryption algorithm, the trailer for the data file, wherein generating further comprises:

determining a number of records and position information associated with the number of records associated with the data file;

determining one or more data fields with numerical data within the data file;

initiating one or more computation algorithms on the one or more data fields with the numerical data, wherein initiating further comprises executing one or more arithmetic calculations on the one or more data fields with numerical data to generate one or more aggregated data values; and generating the trailer, wherein the trailer comprises at least the number of records in the data file, the position information associated with the number of records, and the one or more aggregated data values.

19. A method secure data transmission using fully homomorphic encryption, the method comprising:

electronically retrieving a data file from a source computing device, wherein the data file in encrypted using a public key;

initiating a homomorphic engine on the data file, wherein the homomorphic engine comprises one or more homomorphic encryption algorithms;

generating, using a first homomorphic encryption algorithm, a header and a trailer for the data file;

generating, using the first homomorphic encryption algorithm, a unique row for the data file;

generating an evaluation key based on at least generating the header, the trailer, and the unique row for the data file;

appending the header, the trailer, and the unique row to the data file to generate an appended data file; and transmitting the appended data file to a target computing device.

20. The method of claim 19, wherein the method further comprises:

establishing a communication link with a secure encryption key repository, wherein the secure encryption key repository comprises the public key for decrypting the data file; and storing the evaluation key in the secure encryption key repository, wherein the evaluation key is used to decrypt the appended data file.

* * * * *